United States Patent [19]

Senoo

[11] 3,727,144

[45] Apr. 10, 1973

[54] MEMORY CIRCUIT EMPLOYING A BIPOLAR ULTRASONIC DELAY LINE

[75] Inventor: Takakazu Senoo, Minato-ku, Tokyo, Japan

[73] Assignee: Nippon Electric Company Limited, Tokyo, Japan

[22] Filed: Apr. 1, 1971

[21] Appl. No.: 130,424

[30] Foreign Application Priority Data

Apr. 3, 1970 Japan ................................45/28949

[52] U.S. Cl. ..................328/164, 307/262, 328/140, 328/151

[51] Int. Cl. ................................................H03k 5/00

[58] Field of Search......................328/151, 164, 140; 307/262

[56] References Cited

UNITED STATES PATENTS

| | | | |
|---|---|---|---|
| 3,244,986 | 4/1966 | Rumble | 328/140 |
| 2,972,735 | 2/1961 | Fuller et al. | 340/174.1 |

OTHER PUBLICATIONS

"Pulse Discriminating Latch" by Bolt & Nick IBM Technical Disclosure Bulletin Vol 9 No. 8 January 67 page 985

*Primary Examiner*—James W. Lawrence
*Assistant Examiner*—Harold A. Dixon
*Attorney*—Sughrue, Rothwell, Mion, Zinn & Macpeak

[57] ABSTRACT

Disclosed is a memory system including an ultrasonic delay line storing data signals having a period T, the data signals being stored as a bipolar signal. The positive and negative peaks of the bipolar signal are sensed to produce peak pulses. These peak pulses are used to generate a replica of the stored data signal. Ambiguous peak pulses are eliminated by passing all peak pulses through inhibit gate means, the gate means being operated to block each of those peak pulses which represents a peak of the bipolar signal occurring within a predetermined time, *t*, from its adjacent preceding peak. The predetermined time t is selected to be within the range defined as $T/2 < t < T$.

5 Claims, 6 Drawing Figures

INVENTOR
TAKAKAZU SENOO

BY Sughrue, Rothwell, Mion, Zinn & Macpeak

ATTORNEYS

MEMORY CIRCUIT EMPLOYING A BIPOLAR ULTRASONIC DELAY LINE

This invention relates to a memory circuit employing an ultrasonic delay line which is capable of storing bipolar pulses, such as "+1" and "−1", in response to binary information of a digital signal.

In a memory circuit employing the ultrasonic delay line for storing the bipolar pulses, unnecessary output pulses tend to be generated when a series of incoming pulse signals stand on the same polarity. To avoid this, it has been the practice to slice out the peak parts of the output waveform of the ultrasonic delay line, to form detection pulses, which in turn trigger a monostable multivibrator having nearly one half of the width of the clock period of the bipolar pulses. The outputs of the multivibrator are sampled by sampling pulses with a clock period. According to such amplitude detection method in which the output waveform of the ultrasonic delay line is sliced at a certain specific threshold level, the large variation of jitter due to difference in the pattern or level of the bipolar pulse train causes large variation in the detected pulse width. For example, in an ultrasonic magnetostrictive delay line operating at a clock frequency of 700 KHz to 1 MHz and delay time of 5 to 10 ms, it is often the case that the delay time variation due to temperature, aging, noise, random change in the waveform of the delay line output voltage (and the jitter due to these factors) and so on becomes more than 500 ns. Whereas the minimum pulse width of said monostable multivibrator is about 500 ns, it is apparent that the above-mentioned conventional delay line memory circuit can hardly be practical for use in regeneration of the bipolar pulses.

It is therefore an object of this invention to provide a memory circuit employing ultrasonic delay line, which is capable of stable regenerating pulses in a high frequency band and in a delay time region as mentioned above under various variable conditions.

The other objects, features and advantages of the present invention will be illustrated by the following description taken in conjunction with the accompanying drawings, wherein.

Figure 1:
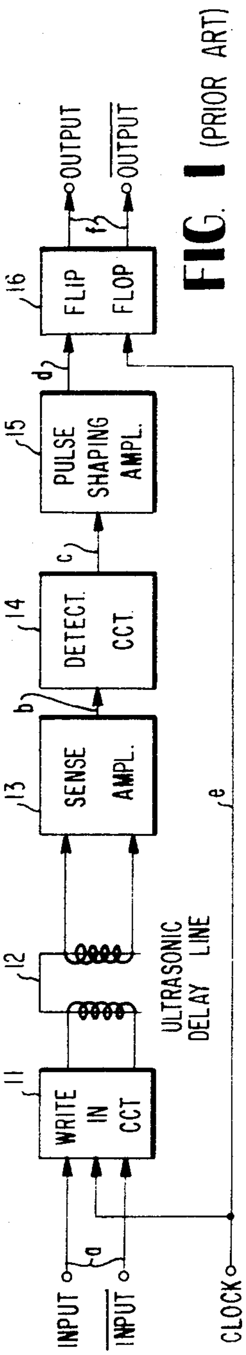
FIG. 1 (PRIOR ART)
FIG. 1 is a block diagram showing a conventional memory circuit employing a bipolar ultrasonic delay line.
Figure 2:
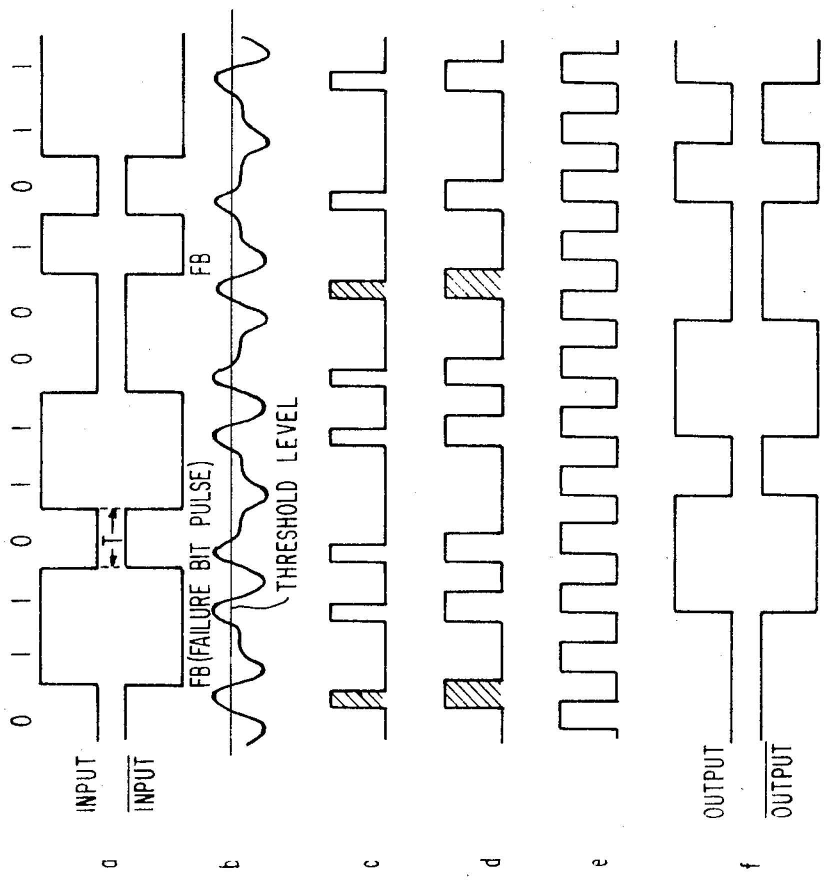
FIGS. 2(*a* through *f*) are waveform diagrams illustrating the operation of the memory circuit of FIG. 1.

In FIG. 1, the reference numeral 11 denotes a write-in circuit; 12, an ultrasonic delay line; 13, a sense amplifier; 14, a detector; 15, a pulse shaping amplifier; and 16, a flip-flop. A binary code pulse train (2-*a*) written in the write-in circuit 11 is converted to a bipolar pulse train therein by using a clock pulse train (2-*e*). This bipolar pulse train written into the ultrasonic delay line 2 is read out and amplified by the sense amplifier 13. This output waveform is shown in 2-*b*. Practically, the pulse train (2-*b*) is delayed by several milliseconds behind the pulse train (2-*a*). For the simplicity of explanation, this delay time is assumed in FIG. 2 to be nearly equal to one clock period. The detector with a predetermined threshold level (shown in 2-*b* by a horizontal line) delivers a detection pulse train (2-*c*) which triggers the pulse shaping amplifier 15 such as a monostable multivibrator. The pulse width of the output pulse (2-*d*) of the amplifier 15 is equal to one half of clock period T. This pulse (2-*d*) and the clock pulse train (2-*e*) are applied to the flip-flop 16 such as a D-type edge-triggered flip-flop, whereby the regenerated pulse train (2-*f*) is obtained.

In this conventional memory circuit, the most stable sampling operation of the pulse train (2-*d*) by the clock pulse train (2-*e*) is carried out when the pulse width of the pulse train (2-*d*) is equal to T/2 (T clock period), and each sampling time point is selected at the center of the each information bit pulse of the pulse train (2-*d*). In this case, the maximum phase deviation (so-called jitter) allowable in the pulse train (2-*d*) with respect to the clock pulse train (2-*e*) is +T/4.

Figure 3:
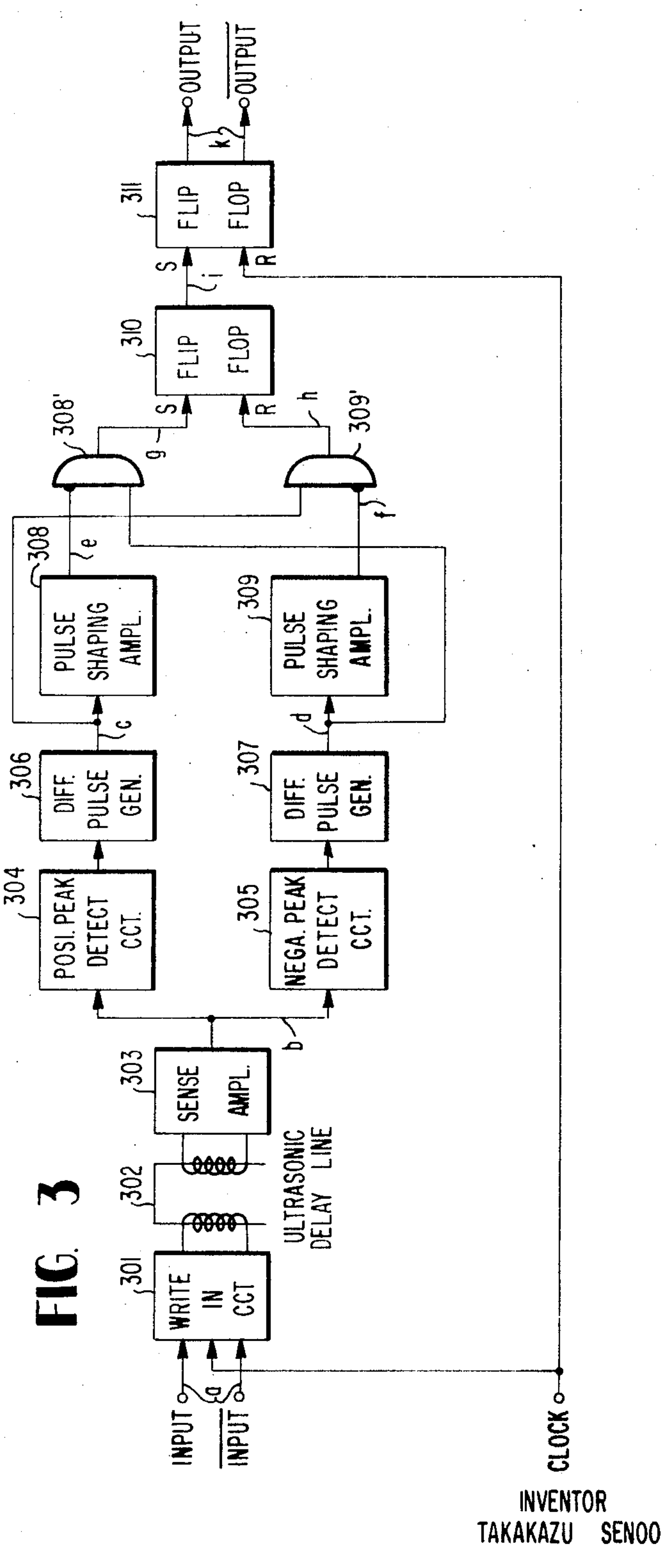
FIG. 3 is a block diagram showing a memory circuit employing a bipolar ultrasonic delay line, according to this invention.

Referring now to FIG. 3, the reference 301 denotes a write-in circuit; 302, an ultrasonic delay line; 303, a sense amplifier; 304 and 305, peak detectors for detecting the time positions of positive and negative peak of its input signal; 306 and 307, differential pulse generators; 308 and 309, pulse shaping amplifiers; 308′ and 309′ inhibit gates; and 310 and 311, flip-flops. It is well known that the memory circuit employing a delay element as mentioned above should be provided with a feedback path for feeding the pulse output to the input side thereof. The feedback circuit used for this purpose is generally known and has no direct relationship with this invention. Therefore, further description is omitted in this specification.

Figure 4:
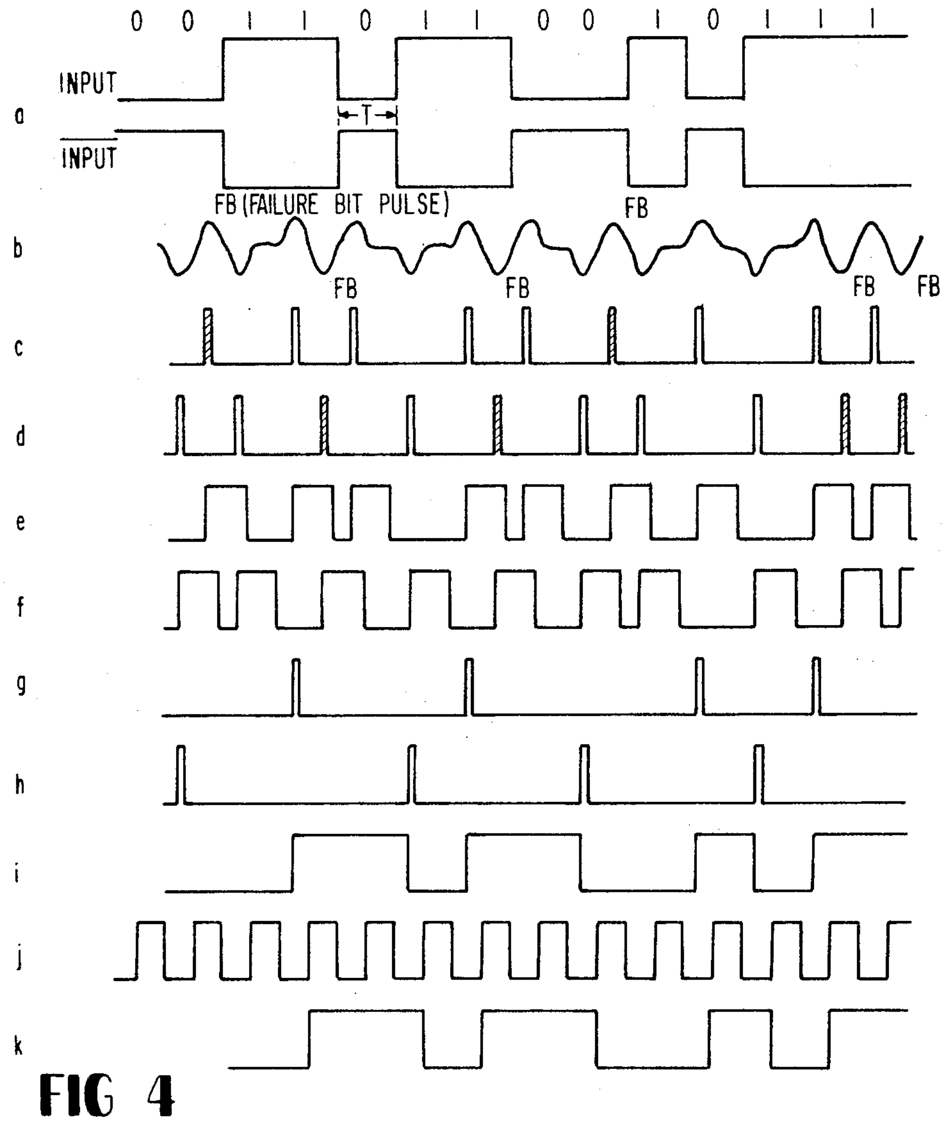
FIGS. 4(*a* through *k*) are waveform diagrams illustrating the operation of the memory circuit of the present invention.

FIG. 4 shows waveforms indicated by the symbols *a* through *k* (hereinafter briefly, 4-*a*, 4-*b*, ... 4-*k*), which are taken at various points of the circuit as in FIG. 3. A binary code train (4-*a*) written by NRZ (non-return to zero) method into the write-in circuit 301 is converted to bipolar pulse train using a clock pulse train (4-*j*). This bipolar pulse train is written into the ultrasonic delay line, and amplified by the amplifier 303. This amplified pulse train is a bipolar pulse (4-*b*) having two polarities corresponding to "1" and "0" of the input pulse train, and then is applied to the peak detectors 304 and 305. Practically, the pulse train (4-*b*) is delayed by several milliseconds behind the pulse train (4-*a*). For the simplicity of explanation, this delay time is assumed in FIG. 4 to be nearly equal to 1 clock period. From the pulse trains detected by the peak detectors 304 and 305, trigger pulses (4-*c*, 4-*d*) are formed by the differential pulse generators 306 and 307. The pulse shaping amplifiers 308 and 309, each being exemplified by a monostable multivibrator whose pulse width is three-quarters the clock period T, are triggered by the trigger pulses (4-*c*, 4-*d*) whereby the pulses (4-*e*, 4-*f*) are obtained. These output pulses (4-*e*, 4-*f*) are applied to the inhibit input terminals of the inhibit gate 308′ and 309′, and the trigger pulses (4-*c*, 4-*d*) to the other input terminals whereby failure bits (FB in 4-*b*) are removed and set pulses (4-*g*) and reset pulses (4-*h*) are obtained. Then, the flip-flop 310 is set by the pulses (4-*g*), and reset by the pulse (4-*h*) whereby an NRZ signal as shown by (4-*i*) is generated as an output of the flip-flop 310. The pulse width of this signal is equal to that of the input signal (4-*a*). The waveform (4-*h*) shows the state of a pulse train after being synchronized with a clock pulse (4-*j*).

In the pulse detecting function of this invention, the greatest stability is needed when the peak detection pulse train is gated by the output of the pulse shaping amplifier. The time range allowed for this operation is indicated by the areas with hatching in FIGS. 4*e* and 4*f*. This range is determined by the time duration between the rise times of the peak detection pulses and of the output of the pulse shaping amplifiers. More particularly, since the time interval between the information bit and failure bit is T/2, the pulse width Tw of the output of the pulse shaping amplifier must be determined to be $T/2<Tw<T$, where the pulse widths of the pulses (4-*c*, 4-*d*) are considered as being negligible small in comparison with the clock period.

In practice, the most desirable pulse width Tw must be $3T/4$ when taking into consideration the deviations of the time positions of pulses (4-*c*, 4-*d*) and pulse widths in the pulses (4-*e*, 4-*f*). The pulse width deviation is considered to be due to short period deviation factors such as (1) power source fluctuation, (2) variation in the output pulses of delay line 302, caused by variation in the pattern of input signal. Long period deviation factors such as (1) delay time drift due to temperature change, (2) delay time change by aging, (3) variation in the clock period, etc. are totally negligible in terms of their influences on said pulse width deviation. As regards the short period deviation, jitter is virtually the only factor contributing thereto. Hence, by using the peak detectors mentioned above, the jitter can be reduced and the range of deviation $T_w$ can be made sufficiently small in comparison with the maximum allowable range T/4. Therefore, it is possible to obtain an output of the flip-flop 310 in exactly the same waveform (4-*i*) as that (4-*a*) of the input signal. Theoretically, therefore, the phase deviation of the pulse train (for example, 4-*i*) in comparison with the clock pulse train is equal to $\pm T/2$. This makes it possible to operate the delay line memory circuit at a comparatively high clock frequency or to realize the delay line memory circuit with a comparatively high memory capacity, in comparison with the conventional memory circuit, even if the long period deviation factor is taken into consideration.

Figure 6:
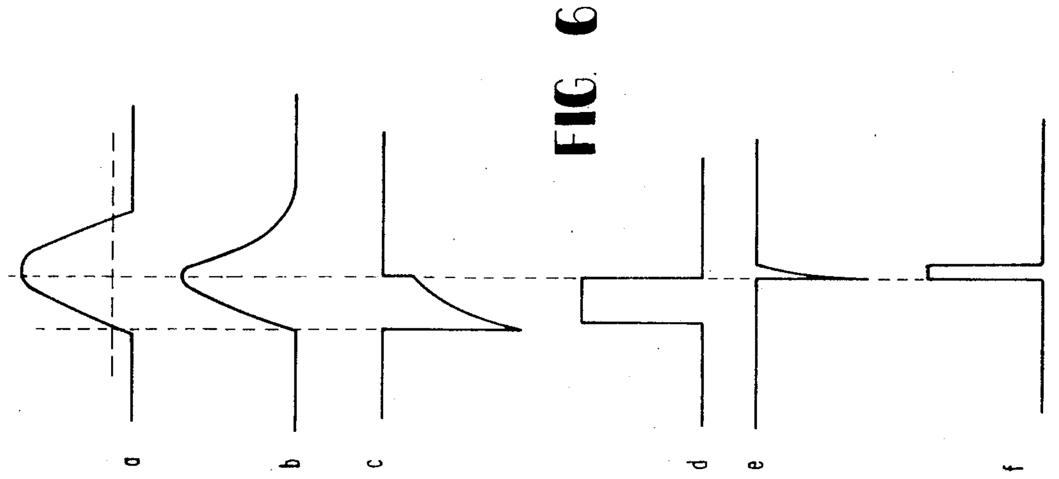
FIG. 6(*a* through *f*) are waveform diagrams illustrating the operation of the peak detector of FIG. 5.
Figure 5:
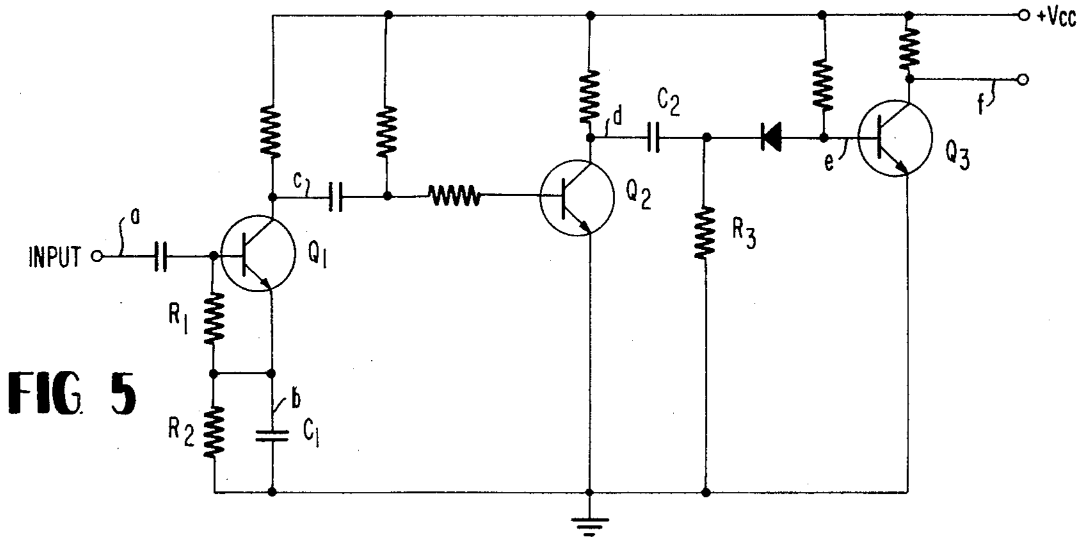
FIG. 5 shows a circuit diagram showing an example of the peak detector in FIG. 3.

Now referring to FIG. 5 showing an example of the peak detector 304 of FIG. 3, and FIGS. 6*a* through 6*f* (hereinafter briefly, 6-*a* through 6-*f*), this detector 304 detects the positive peak of the input pulse train (6-*a*). The transistor $Q_1$ stands conductive state when the input pulse (2-*a*) exceeds a threshold level (shown by a horizontal broken line in FIG. 2*a*). After this time point, the emitter and collector voltages vary as shown in FIGS. 6*a* and 6*c*, respectively. The transistor $Q_1$ remains in cut-off state at the peak time position of the input pulse (6-*a*). The pulse (6-*c*) is phase-inverted and shaped by the transistor $Q_2$ as shown in FIG. 6*d*. The pulse (6-*d*) is differentiated by a differentiating circuit ($C_2$ and $R_3$), and its trailing edge pulse (6-*e*) is converted to a shaped pulse (6-*f*). This pulse (6-*f*) corresponds to one of the peak detection pulses shown in FIG. 4*c*.

What is claimed is:

1. A system for recovering binary data signals having a period T and being stored as a bipolar phase modulated signal in an ultrasonic delay line, said bipolar signal including ambiguous peaks, comprising:

a. first and second peak signal detectors for generating respectively peak pulses corresponding to the positive and negative peaks of said bipolar signal, b. first and second inhibit pulse producing means responsive respectively to the signals from said first and second peak signal detectors for generating inhibit pulses having a predetermined time duration, said duration being less than the time *T* but greater than the time *T*/2, c. first gate means responsive to the inhibit pulses from said second inhibit pulse producing means for blocking pulses from said first peak detector which are in time coincidence with said inhibit pulses from said second inhibit pulse producing means, d. second gate means responsive to inhibit pulses from said first inhibit pulse producing means for blocking peak pulses from said second peak detector which are in time coincidence with said inhibit pulses from said first inhibit pulse producing means, and e. bistable means responsive to peak pulses from said first and second gate means for generating a replica of said data signals.

2. A data signal system for reading out stored data signals having a period T, said data signals being stored as a bipolar signal, said bipolar signal including ambiguous peaks, comprising:

a. first and second peak signal detectors for generating peak pulses corresponding in time to positive and negative peaks, respectively, of said bipolar signal, and b. means for blocking each of those peak pulses which corresponds to a peak of said bipolar signal occuring within a predetermined time from the occurrence of its adjacent preceding peak, said predetermined time being greater than T/2 but less than T, c. wherein said means for blocking comprises:

i. first and second inhibit pulse producing means responsive respectively to the signals from said first and second peak signal detectors for generating inhibit pulses having a predetermined time duration, said duration being less than the time T but greater than the time *T*/2, ii. first gate means responsive to inhibit pulses from said second inhibit pulse producing means for blocking peak pulses from said first peak detector occurring in time coincidence with said inhibit pulses from said second inhibit pulse producing means, iii. second gate means responsive to inhibit pulses from said first inhibit pulse producing means for blocking peak pulses from said second peak detector occurring in time coincidence with said inhibit pulses from said first inhibit pulse producing means, and iv. bistable means responsive to peak pulses from said first and second gate means for generating a replica of said data signals.

3. The data signal readout system of claim 2 wherein said first and second pulse producing means generate pulses having a time duration substantially equal to three quarters of the period of said data signals.

4. The data signal readout system of claim 2 wherein said bipolar phase modulated signal is stored in an ultrasonic delay line.

5. The data signal readout system of claim 4 wherein said first and second inhibit pulse producing means are comprised of monostable multivibrators and wherein said first and second peak signal detectors comprise respectively a positive peak detecting circuit and a differential pulse generator responsive to said positive peak detecting circuit and a negative peak detecting circuit and another differential pulse generator responsive to said negative peak detecting circuit.

* * * * *